July 11, 1961 R. E. RISLEY ET AL 2,992,022
SECTIONAL PIPE CLAMP
Filed July 23, 1957 2 Sheets-Sheet 1
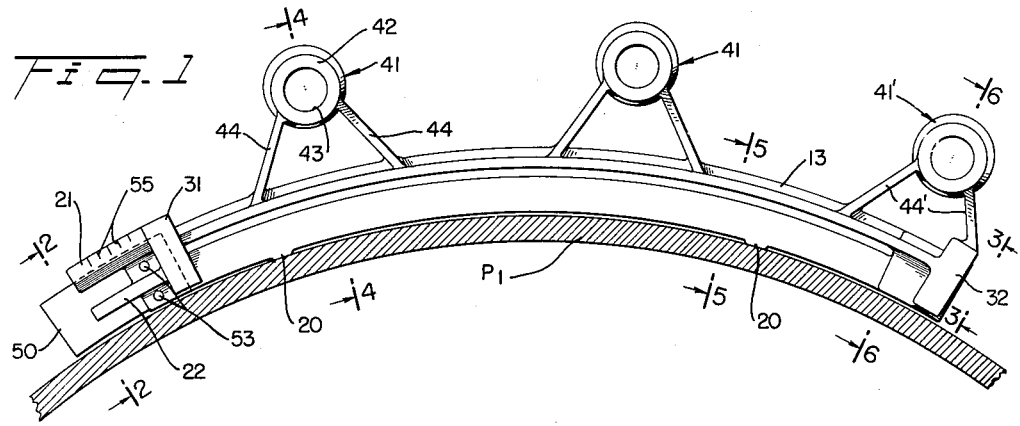
Fig. 1
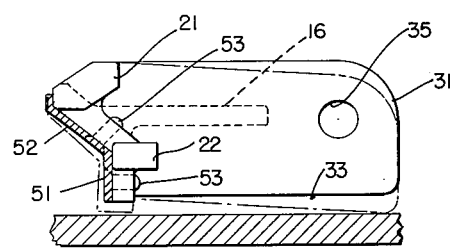
Fig. 2
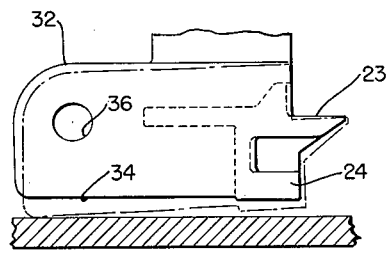
Fig. 3
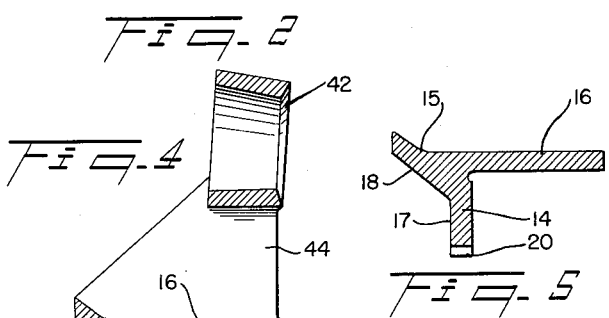
Fig. 4
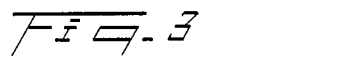
Fig. 5
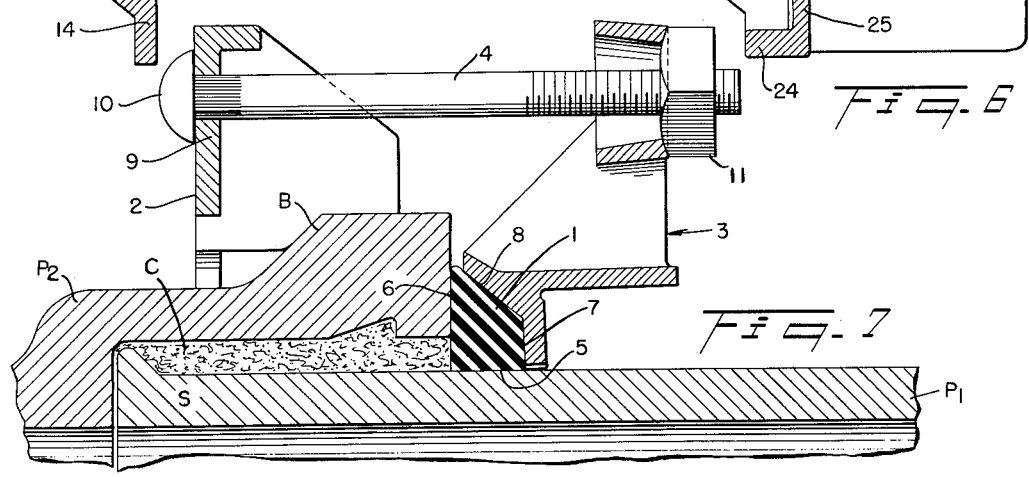
Fig. 6
Fig. 7

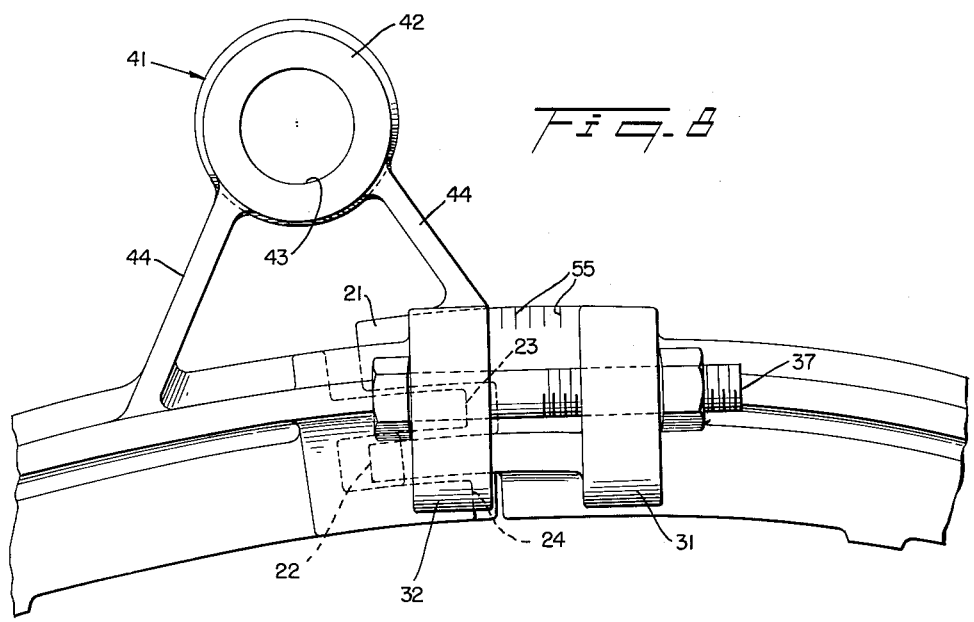
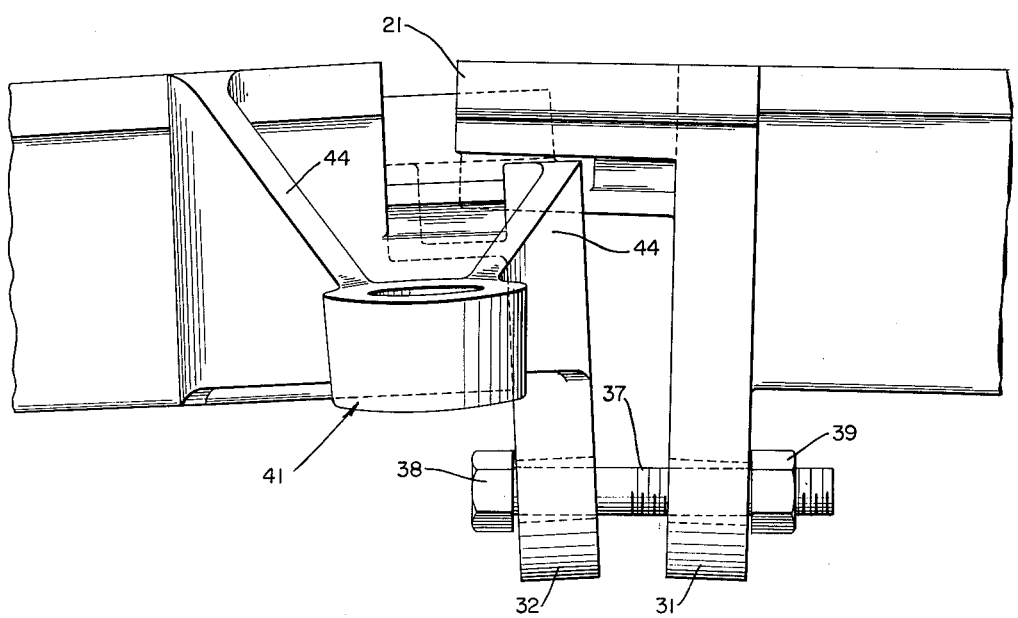

United States Patent Office 2,992,022
Patented July 11, 1961

2,992,022
SECTIONAL PIPE CLAMP
Roger E. Risley and Howard L. Hoke, Bradford, Pa., assignors to Dresser Industries, Inc., Dallas, Tex., a corporation of Delaware
Filed July 23, 1957, Ser. No. 673,709
3 Claims. (Cl. 285—337)

The present invention relates to pipe clamps, the term pipe being used in a generic sense to include pipes, tubes and other conduits. In particular, the invention is directed to a pipe clamp comprising an annular gasket, a gasket ring or "follower" ring having a gasket-engaging face and means for moving the follower ring axially of the pipe to apply pressure to the gasket and thereby obtain a fluid tight seal.

Clamps of this kind are useful for example in making or repairing joints in bell and spigot pipe lines. One end of each section of pipe is enlarged to provide a bell into which the opposite end of the next pipe section fits, the inner end being called a "spigot." In making up a bell and spigot joint, caulking material is usually packed in the annular space between the bell and spigot to make a seal. However, during service of the pipeline, joints may become defective and develop leaks. The invention is directed to provide an improved clamp for repairing such joints to stop the leaks. Moreover, the clamps may be used in making up new pipe joints to assure long, leak-free service. In using the clamp of the present invention on a bell and spigot pipe joint, the annular gasket and the follower ring are placed around the spigot end of the pipe and an anchor ring is secured around the bell end, with bolts extending from the anchor ring to the follower ring. The bolts are then tightened to move the follower ring axially of the pipe and thereby press the gasket tightly against the end face of the bell and the adjacent portion of the spigot to form a fluid tight seal.

Several problems arise in using pipe clamps of this kind. In order to assure a continuous fluid tight seal, it is important for the follower ring to apply uniform high pressure to the gasket throughout its circumferential extent. This would present no particular difficulty if the ring were continuous. However, in order to get the ring on a pipe without opening the pipeline, it is necessary to make the ring in a plurality of arcuate sections which are fastened together. Moreover, pipes of the same nominal size vary considerably in actual outside diameter and hence sections of a ring which fit minimum size pipes will be spaced considerably from one another when used on maximum size pipes. The points of connection between successive sections of the follower ring tend to be trouble points. As the continuity of the gasket-engaging surface of the follower ring is interrupted, the pressure applied to the gasket at these points tends to be low and hence leaks may result. It has been proposed to overcome this difficulty by inserting filler pieces between the ends of adjacent ring sections when used on larger than minimum size pipes. While such couplings have been satisfactorily used, the fillers have the disadvantage that they may be lost, additional time and care are required to insert them and they provide only step-by-step rather than continuous variation in ring size.

A further difficulty arises from the fact that the bolts connecting the follower ring to the anchor ring have to be outside the periphery of the bell and outside the gasket. The pull of the bolts and the resistance of the gasket to compression hence produce a couple tending to twist or roll the arcuate ring sections about the gasket as a fulcrum. Because of the curvature of the arcuate sections, this rolling action tends to press the central portion of each section more tightly against the gasket while the end portions swing away from the gasket and apply little or no pressure.

The purpose of the present invention is to overcome these difficulties and provide an improved pipe clamp of simple construction that accommodates a considerable variation in pipe diameter without the need of filler pieces and obtains uniformly high gasket pressure throughout its circumferential extent to assure a fluid tight seal. The construction in accordance with the invention and the manner in which it functions to obtain uniformity of gasket pressure will become apparent from the following description and the accompanying drawings in which:

FIG. 1 is a partial cross section of a pipeline showing in elevation one segment of a follower ring of a pipe clamp in accordance with the invention.

FIG. 2 is an enlarged end view of the left end of the ring section shown in FIG. 1, with a spanner plate shown in cross section.

FIG. 3 is an enlarged end view of the right end of the ring section shown in FIG. 1.

FIGS. 4, 5 and 6 are enlarged cross sections taken respectively on the lines 4—4, 5—5 and 6—6 in FIG. 1.

FIG. 7 is an axial section showing a pipe clamp in accordance with the invention applied to a bell and spigot pipe joint.

FIG. 8 is a fragmentary elevation showing the connection between adjacent sections of the follower ring.

FIG. 9 is a fragmentary plan showing the connection between two ring sections.

In FIG. 7, there is shown by way of example a pipe clamp in accordance with the invention applied to a bell and spigot pipe joint. The spigot end S of one pipe section P1 fits into the bell end B of the adjacent pipe section P2 with suitable caulking material C filling the annular space between the bell and spigot. As shown in FIG. 7, the pipe clamp comprises an annular gasket 1, a bell or anchor ring 2, a follower or "spigot" ring 3 and bolts 4 connecting the bell and spigot rings.

The gasket 1 is preferably formed of rubber, the term "rubber" being used in a generic sense to include both natural and synthetic elastomer material. It is split at one point in its circumferential extent so that it can be placed around the pipe without opening the pipeline. The gasket 1 is shown as being trapezoidal in cross section with an inner face 5 that engages the spigot end S of a pipe section, a radial face 6 that engages the end of the bell B and an opposite radial face 7 and inclined face 8 that are engaged by the spigot ring 3.

The bell ring 2 preferably comprises a plurality of arcuate sections which are adjustably connected with one another to form a complete ring fitting the bell B. A radial flange portion 9 is provided with holes to receive the bolts 4. Each of the bolts is provided at one end with a head 10 while the other end is threaded to receive a nut 11.

The spigot ring 3 comprises a plurality of like arcuate sections 13 of which one is shown in FIG. 1. There are preferably at least 3 sections in each ring, more being used for larger size pipes. In cross section each ring section comprises a radial flange portion 14, an inclined flange portion 15 and a rearwardly extending flange portion 16. The rearwardly extending flange 16 is relatively wide to strengthen and stiffen the ring section. The ring section has a gasket-engaging face comprising a radial portion 17 adapted to engage the radial face 7 of the gasket 1 and an inclined portion 18 adapted to engage the inclined face 8 of the gasket.

On the inner periphery of the radial flange portion 14 of each ring section there are provided two bosses 20 which project inwardly and rest on the pipe so as to provide a space between the pipe and the inner periphery of the ring section as clearly shown in FIG. 1. The two bosses 20 are spaced from one another and from the ends of the ring section the distance between the two bosses being preferably about twice the distance between the bosses and the ends of the ring section. The height of the bosses 20 in a radial direction is sufficient to provide a space between the inner periphery of the ring section and the pipe but the space should not be large enough to permit undesired flow of gasket material through the space. It has been found that the space should preferably be of the order of 1/8 inch to 1/4 inch, the preferred value being about 3/16 inch.

The ends of adjacent sections 13 of the spigot ring 3 have interfitting portions providing continuity of the ring structure while permitting circumferential movement of the adjacent sections relative to one another to vary the size of the ring. As shown by way of example in FIGS. 1, 2 and 3, one end of each ring section is provided with circumferentially projecting fingers 21 and 22. The two fingers 21 and 22 are spaced radially from one another and the inner finger 22 is spaced radially outwardly from the inner periphery of the ring spigot. The opposite end of the ring section 13 is similarly provided with circumferentially projecting fingers 23 and 24. The fingers are positioned so that when the ring sections are assembled the finger 23 of one section fits in between fingers 21 and 22 of the adjacent section (FIG. 8) while finger 22 of the latter section fits in between fingers 23 and 24 of the first section. As seen in FIGS. 2 and 3, the fingers are of greater axial than radial extent. The forward faces of the fingers 21 to 24 lie substantially in the planes defining the gasket-engaging faces 17 and 18 of the ring. The slidably interfitting fingers thus provide a substantially continuous gasket-engaging surface while at the same time permitting relative movement of adjacent sections toward and away from one another in a circumferential direction to adjust the spigot ring to the size of the particular pipe on which it is used.

The rear portions of fingers 23 and 24 are connected with one another by a radially extending portion 25 which is adapted slidably to engage the rear face of finger 22 of the adjacent ring section. In like manner, a portion 26 projecting radially outwardly from the finger 23 is adapted to engage the rear face of finger 21 of the adjacent section. As will be described more fully below, portions 25 and 26 transmit axially directed forces from one section to the other and maintain alignment of the adjacent sections in an axial direction. The interfitting fingers 21 and 22 assure alignment of the adjacent ring sections in a radial direction. The interfitting end portions of adjacent sections thus provide continuity of the ring while permitting movement of the sections relative to one another in a circumferential direction to vary the size of the ring to fit the particular pipe on which the ring is used.

Each of the ring sections 13 is provided adjacent its opposite ends with lugs 31 and 32 which project rearwardly from the ring in a direction away from the gasket-engaging face 17, 18 and parallel to the axis of the pipe. The lugs 31 and 32 are of rugged construction and join the rearwardly projecting flange portion 16 as well as the radial flange portion 14 and inclined flange portion 15 of the ring. The lugs 31 and 32 preferably extend rearwardly a substantial distance beyond the rear edge of the flange 16. The width of the lugs 31 and 32 in a radial direction is preferably approximately equal to the radial extent of the end portions of the ring section. However, the inner edges 33 and 34 of the lugs are preferably slightly offset radially outwardly from the inner periphery of the radial flange 14. Thus when the ring sections are in normal position as illustrated in solid lines in FIGS. 2 and 3, the inner edges 33 and 34 of lugs 31 and 32 are spaced from the pipe a selected distance depending on the height of the bosses 20 (FIG. 1) and the amount the inner edges of the lugs are offset from the inner periphery of the flange 14.

As shown in FIG. 1, the rearwardly projecting lug 31 is spaced a short distance inwardly in a circumferential direction from the inner ends of fingers 21 and 22 while the rearwardly projecting lug 32 is located substantially at the outer ends of fingers 23 and 24 and hence projects rearwardly from the radially extending portions 25 and 26 (FIG. 6). The rear portions of lugs 31 and 32 are provided with bolt holes 35 and 36 which are preferably located approximately in alignment with the rearwardly projecting flange 16 of the ring section. A bolt 37 (FIGS. 8 and 9) having a head 38 and nut 39 extends through aligned bolt holes 35 and 36 of the lugs 31 and 32 of adjacent ring sections when assembled to connect the sections together. It will be seen that when the nut 39 is tightened, the adjacent ring sections are drawn toward one another.

Each ring section is also provided with a plurality of bolt lugs or brackets 41 which project radially outwardly from the ring section. Each of the bolt lugs comprises an outer ring portion 42 having a bolt hole 43 to receive one of the bolts 4 and diverging leg portions 44 connecting the ring portion 42 to the ring section 13. One of the bolt lugs 41 is located substantially at the end of the ring section on which the radially extending portions 25 and 26 are provided i.e. the right hand end as shown in FIG. 1. The lug 41' is so positioned that when the ring sections are assembled, the bolt hole of the lug 41' is disposed radially outwardly from the interfitting end portions of adjacent sections. One leg 44' of the bolt lug 41' joins the upper edge portion of the rearwardly extending lug 32 and is thereby joined with radially extending portions 25 and 26. Hence the pull of a bolt 4 on the lug in an axial direction is transmitted not only to the end of the ring section on which the lug is mounted but also—through radial portions 25 and 26—to the interfitting portion of the adjacent section. The other bolt lugs 41 of the ring section are located so that when the ring sections are assembled, the bolt lugs 41 of the ring section are located so that when the ring sections are assembled, the bolt lugs are approximately equally spaced around the circumference of the ring. Thus when the ring section is provided with three bolt lugs as illustrated in FIG. 1, the spacing between the lugs is approximately equal to one third the circumferential length of the ring sections. It will be seen that the bolt lugs are asymetrically arranged so that a lug is provided at one end only of the section, the other lugs being spaced from the end.

While the intermeshing fingers 21 to 24 at the ends of the ring sections provide a substantially continuous gasket engaging ring structure, it will be understood that except when the fingers are fully intermeshed there will be small spaces between the fingers. To provide complete continuity of the gasket-engaging surface of the ring and thereby avoid any possibility of the extrusion of gasket material, spanner plates 50 are provided between the spigot ring and gasket at the zones where adjacent end portions of the sections intermesh. Each of the spanner plates 50 conforms to the cross sectional shape of the gasket-engaging face of the spigot ring. As shown in FIG. 2, the spanner plate has a radially extending portion 51 corresponding to the gasket-engaging face 17 of the ring and an inclined portion 52 conforming to the inclined gasket-engaging face 18. The length of the spanner plate in a circumferential direction is sufficiently great to bridge the spaces between adjacent ring sections when adjusted for maximum diameter pipes. The spanner plate 50 is formed of material that is as thin as practical while strong enough to withstand gasket pressures, for example stainless steel sheet having a thickness of the order of ³⁄₃₂ inch. It will be appreciated that the spanner plate shown in FIGS. 1 and 2 is stiffened by its angular shape. Suitable means is provided for securing the spanner plate in proper position. It may for example be vulcanized or cemented on, or set into, the gasket 1, or may be secured to the spigot ring. In the example shown in FIGS. 1 and 2, the spanner plate 50 is secured to one end of the ring section 13 by means of pins or rivets 53.

In applying the clamp of the present invention to a pipe joint, the gasket 1 is placed around the spigot end of the pipe adjacent the end face of the bell and the bell ring 2 and spigot ring 3 are assembled on the pipe with bolts 4 extending between the two rings. The adjacent sections of the spigot ring are loosely connected by bolts 37. In this condition, the gasket-engaging faces 17 of the spigot ring sections lie substantially in a plane perpendicular to the axis of the pipe and the lugs 31 and 32 of the ring sections extend substantially parallel to the pipe axis with a space between the lugs and the pipe as shown in solid lines in FIGS. 2 and 3. The bolts 37 are then tightened to draw adjacent sections of the ring toward one another in a circumferential direction. The bolts 37 are preferably tightened successively and uniformly so that the spacing of the sections around the pipe is kept uniform. This is facilitated by providing a scale or calibration on the interfitting portions of the section as illustrated at 55 in FIGS. 1 and 8. As the section spigot ring is drawn tight on the pipe, continued tightening of the bolts 37 draws the rear ends of lugs 31 and 32 toward one another and thereby causes the ring sections 13 to tilt or cant about the bosses 20 as fulcrums. In this position, the lugs 31 and 32 are no longer parallel but are inclined rearwardly toward one another as illustrated in FIG. 9. Moreover, the rear ends of the lugs tilt inwardly toward the pipe wall as illustrated in broken lines in FIGS. 2 and 3. By reason of the canting of the ring sections, the gasket-engaging faces 17 are no longer in a single plane perpendicular to the axis of the pipe but the gasket-engaging face of each section forms a small dihedral angle with the gasket-engaging face of the adjacent section. The central portion of the gasket-engaging face of each section is tilted slightly away from the gasket while the end portions of the gasket-engaging face are tilted toward the gasket. The amount of tilting is selectively limited by the initial spacing of the lugs 31 and 32 from the pipe.

The through bolts 4 are then tightened to draw the spigot ring toward the bell ring and thereby apply pressure to the gasket. The pull of the through bolts 4 tends to roll the ring sections in a counterclockwise direction as viewed in FIG. 7. However, this rolling is resisted by bolts 37 acting on the lugs 31 and 32 which constitute rearwardly extending lever arms on the ring section. Ordinarily, the gasket pressure applied by a sectional spigot ring is substantially lower at the points of connection between successive ring sections. However, with the construction in accordance with the present invention the dihedral angle produced by tightening of bolts 37 as described above increases gasket pressure at the points of connection between adjacent ring sections and thereby counteracts the normally lower pressure at these points to provide substantially uniform gasket pressure throughout the circumferential extent of the ring. The location of the through bolt lug 41' at the point of connection between adjacent ring sections and the provision of radially extending portions 25 and 26 to transmit axial force from one section to the other further contribute to securing uniformity of gasket pressure. The spanner plate 50 prevents loss of pressure at the points of connection between ring sections by extrusion of gasket material. It will be seen that the spanner plate is backed-up by the intermeshing fingers 21 to 24 so that the plate is capable of withstanding high gasket pressure even though it is relatively thin.

There is thus provided an improved pipe clamp which is of simple construction and yet overcomes the aforementioned difficulties experienced with prior sectional pipe clamps. While a preferred embodiment of the invention has been shown in the drawings and particularly described, it will be understood that the invention is in no way limited to this particular embodiment and that certain features of the invention may be used while omitting other features.

What we claim and desire to secure by Letters Patent is:

1. A pipe clamp comprising an annular gasket, a gasket ring, an anchor ring and a plurality of through bolts extending between said rings to draw them toward one another and thereby move said gasket ring axially of the pipe to apply pressure to the gasket, said gasket ring comprising a circular series of at least three like arcuate sections disposed end-to-end, each of said sections having a gasket-engaging face, the ends of adjacent sections having interfitting portions permitting circumferential movement of said sections relative to one another to vary the size of said ring, said through bolts engaging the gasket ring radially outwardly of said gasket so that the pull of said through bolts tends to roll said arcuate sections in a direction to move the ends of said sections in a direction away from said gasket, arms projecting rearwardly from said sections in a direction opposite said face and adjacent the ends of said sections, said arms being disposed radially inwardly of said through bolts, and bolt joining means extending in a direction tangential to said sections and connecting said arms of adjacent sections, said tangential bolt means acting in a circumferential direction between rear end portions of said arms to draw said arms toward one another, at least one of said arms being spaced circumferentially from the end of the respective section and said arms being spaced apart sufficiently that the pull of said tangential bolt means on the rear end portion of said arms acts to axially cant said sections relative to one another so that the gasket-engaging face of each sections forms an obtuse dihedral angle with the gasket-engaging face of adjacent sections whereby the ends of said sections are biased toward said gasket by the pull of said tangential bolt means to counteract the rolling action imparted by the pull of said through bolts and thereby apply substantially equal pressure to said gasket throughout its circumferential extent.

2. A pipe clamp according to claim 1, in which said interfitting portions comprise a plurality of interleaved fingers each having a forward gasket-engaging face, said fingers including two fingers on one of said sections spaced radially from one another and a finger on the adjacent section slidably fitting between said spaced finger.

3. A pipe clamp comprising an annular gasket, a gasket ring, an anchor ring, a plurality of through bolts extending between said rings to draw them toward one another and thereby move said gasket ring axially of the pipe to apply pressure to the gasket, said gasket ring comprising a circular series of at least three like arcuate sections disposed end-to-end, said through bolts engaging the gasket ring radially outwardly of said gasket so that the pull of said through bolts tends to roll said arcuate sections in a direction to move the ends of said sections in a direction away from said gasket, each of said sections having a gasket-engaging face and having only two bosses spaced from the ends of said section and from each other and projecting radially inwardly to rest on the pipe and support the section with a radial space between the pipe and the inner periphery of said section, arms projecting rearwardly from said sections in a direction opposite said face and adjacent the ends of each section, said arms being disposed radially inwardly of said through bolts, and bolt joining means extending in a direction tangential to said sections and connecting said arms of adjacent sections, said tangential bolt means acting in a circumferential direction between rear end portions of said arms to draw the rear end portions of said arms toward one another, at least one of said arms being spaced circumferentially from the end of the respective section and said arms being spaced apart sufficiently that the pull of said tangential bolt means on the rear end portion of said arms acts to tilt said sections about said bosses as fulcrums so that the gasket-engaging face of each section forms a selected obtuse dihedral angle with the gasket-engaging face of adjacent sections thereby biasing said section ends toward said gasket by the pull of said tangential bolt means to counteract the rolling action imparted by the pull of said through bolts and thereby apply substantially equal pressure to said gasket throughout its circumferential extent.

References Cited in the file of this patent

UNITED STATES PATENTS

| | | |
|---|---|---|
| Re. 19,938 | Merrill | Apr. 21, 1936 |
| 1,165,388 | Clark | Dec. 28, 1915 |
| 1,909,297 | Merrill | May 16, 1933 |
| 1,916,968 | Davis | July 4, 1933 |
| 1,951,034 | Norton | Mar. 13, 1934 |
| 1,993,927 | Gavin | Mar. 12, 1935 |
| 2,059,573 | Gavin | Nov. 3, 1936 |
| 2,079,731 | Clark | May 11, 1937 |
| 2,220,986 | Bartell | Nov. 12, 1940 |
| 2,415,753 | Newell | Feb. 11, 1947 |
| 2,822,195 | Hoke | Feb. 4, 1958 |
| 2,868,576 | Boughton | Jan. 13, 1959 |